G. E. DEAN.
POULTRY COOP OR CRATE.
APPLICATION FILED NOV. 9, 1914.
1,179,703.
Patented Apr. 18, 1916.
4 SHEETS—SHEET 1.
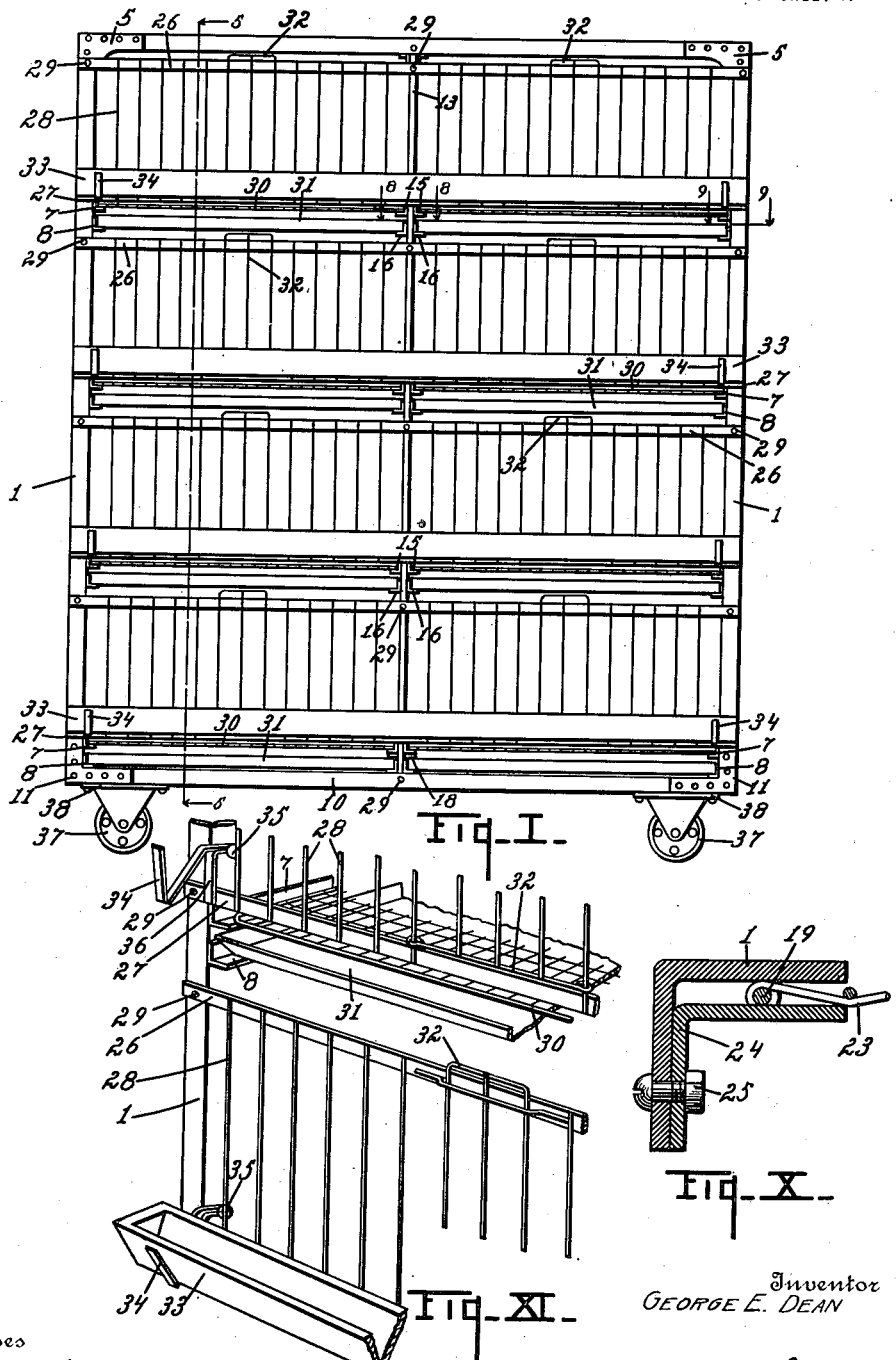
Inventor
GEORGE E. DEAN G. E. DEAN.
POULTRY COOP OR CRATE.
APPLICATION FILED NOV. 9, 1914.
1,179,703.
Patented Apr. 18, 1916.
4 SHEETS—SHEET 2.
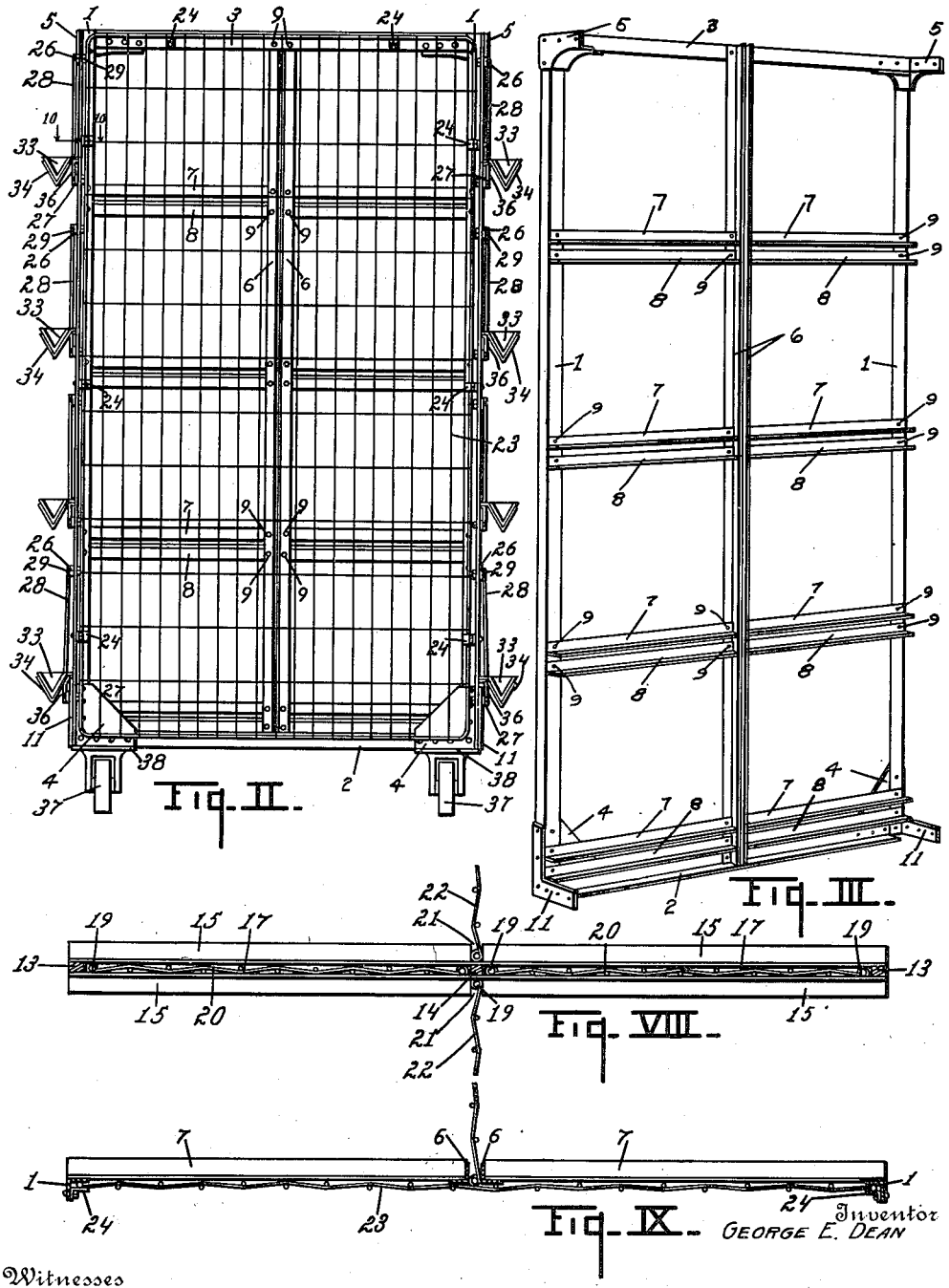
Inventor
GEORGE E. DEAN
Witnesses
By Chappell & Earl
Attorneys

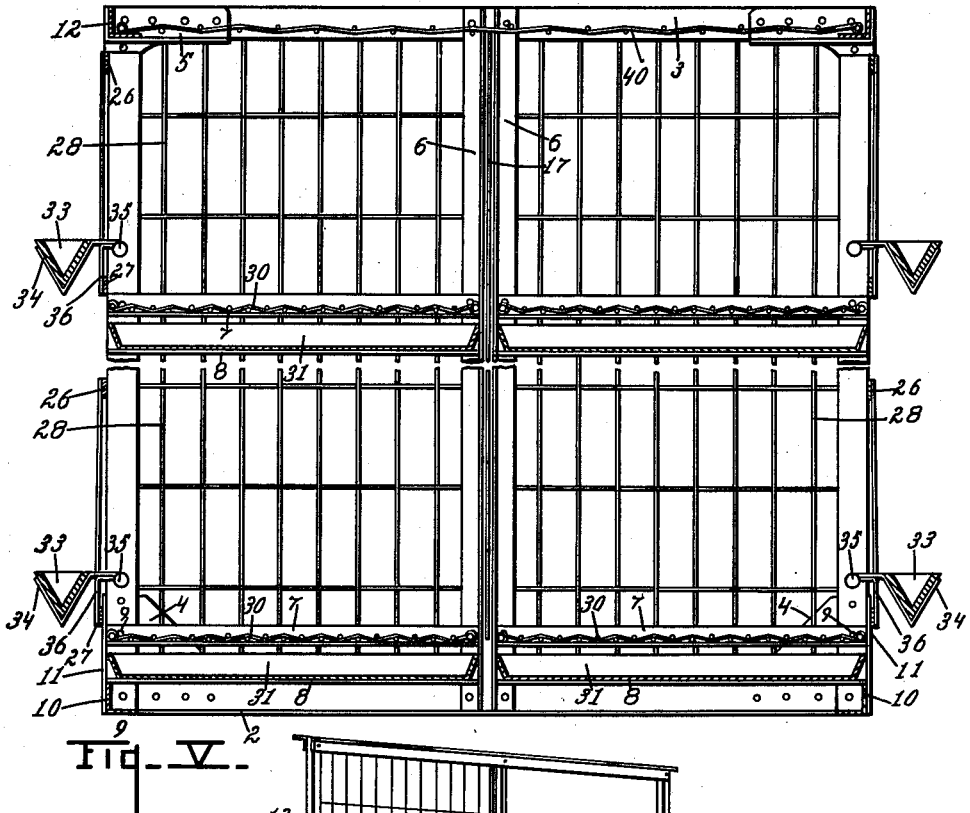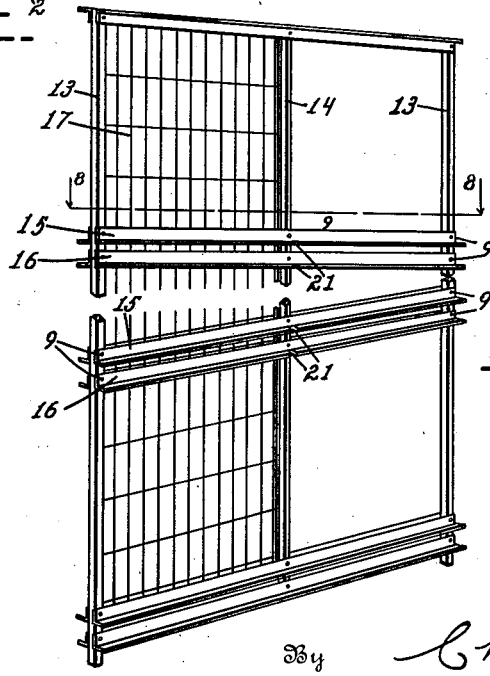

G. E. DEAN.
POULTRY COOP OR CRATE.
APPLICATION FILED NOV. 9, 1914.
1,179,703.
Patented Apr. 18, 1916.
4 SHEETS—SHEET 4.
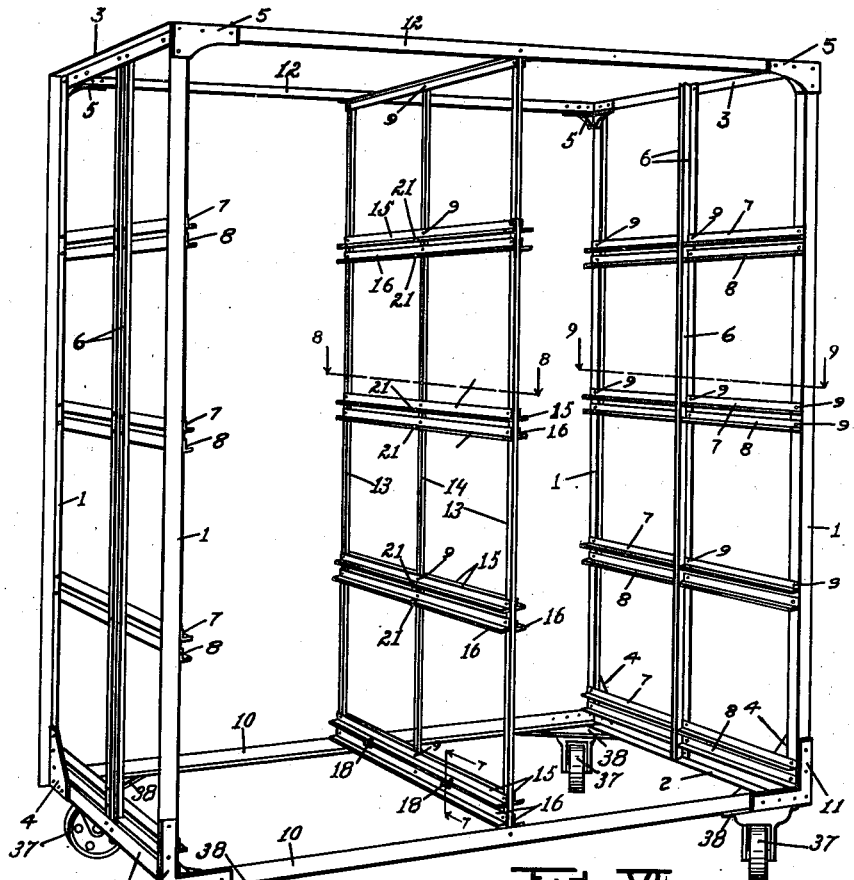
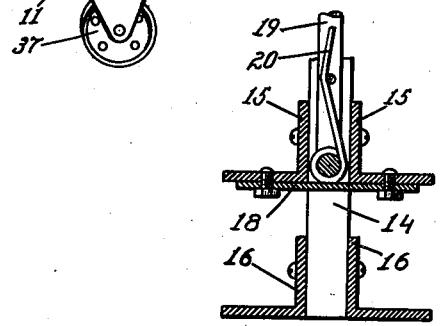
Inventor
GEORGE E. DEAN
Witnesses
By
Attorneys

UNITED STATES PATENT OFFICE.

GEORGE E. DEAN, OF ALBION, MICHIGAN, ASSIGNOR TO THE UNION STEEL SCREEN COMPANY, OF ALBION, MICHIGAN.

POULTRY COOP OR CRATE.

1,179,703. Specification of Letters Patent. Patented Apr. 18, 1916.

Application filed November 9, 1914. Serial No. 871,060.

*To all whom it may concern:*

Be it known that I, GEORGE E. DEAN, a citizen of the United States, residing at Albion, Michigan, have invented certain new and useful Improvements in Poultry Coops or Crates, of which the following is a specification.

This invention relates to improvements in poultry coops or crates.

The main objects of this invention are: First, to provide an improved poultry coop or crate which is well adapted for display or exhibition purposes or for feeding purposes which permits the care of a large number of fowls in a comparatively small space and so that only few fowls are kept in each compartment which is an advantage well known to poultry raisers. Second, to provide an improved poultry coop or crate having a plurality of compartments and one in which the compartments are all fully accessible. Third, to provide an improved poultry coop or crate which may be shipped in the knockdown and easily set up or assembled and one which may be easily knocked down and when knocked down may be compactly arranged for storage or transportation. Fourth, to provide an improved poultry coop or crate having a plurality of compartments in which the several compartments may be readily cleaned.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a side view of my improved poultry coop. Fig. II is an end view thereof. Fig. III is an inside perspective view of one of the end members of the frame. Fig. IV is a detail perspective view of the partition member of the frame, one of the screen partition panels being shown in position. Fig. V is a detail transverse section on a line corresponding to line 5—5 of Fig. I. Fig. VI is a perspective view of the frame with the wall and partition panels removed. Fig. VII is an enlarged detail vertical section on a line corresponding to line 7—7 of Fig. VI showing details of the partition frame and the arrangement of the partition panels therein. Fig. VIII is an enlarged detail horizontal section on a line corresponding to line 8—8 of Figs. I, IV and VI, the partition panels being shown in place. Fig. IX is a detail horizontal section on a line corresponding to line 9—9 of Figs. I and VI. Fig. X is an enlarged detail section on a line corresponding to line 10—10 of Fig. II, showing the means for securing the end wall panels. Fig. XI is an enlarged detail perspective view showing the arrangement of the top, bottoms and pans, and the feeding troughs.

In the drawing similar reference characters refer to similar parts throughout the several views and the sectional views are taken looking in the direction of the little arrows at the ends of the section lines.

Referring to the drawing, the end members of the frame consist of the corner uprights 1, bottom pieces 2, and top pieces 3. These are united by the bottom corner irons 4 and top corner irons 5. The upright corner members and the top members are arranged with their angles facing outwardly while the bottom members 2 are arranged with their angles facing inwardly. A pair of spaced partition uprights 6 are arranged with their upper ends against the inner sides of the top members 3 of the end frames and their lower ends in the angles of the bottom end frame members 2. These partition uprights are arranged back to back with their angles facing inwardly and are spaced to receive the longitudinal partition panels, as will be later described. On these partition uprights 6 and corner uprights 1 I mount ledges 7 and 8 for the screen coop floors and the sub-floors or pans. These ledges are formed of angle iron arranged with their outer ends on the inner sides of the corner uprights 1 and their inner ends within the angles of the partition uprights 6, see Fig. III. The various parts are secured together by suitable bolts or rivets 9, shown conventionally in the drawing.

The bottom longitudinal sills 10 are removably secured to the bottom corner irons 4, which are provided with arms 11 to which the members 10 are bolted. Stove bolts are found satisfactory for this purpose.

The top longitudinal members 12 are removably secured to the top corner irons 5 by means of suitable bolts. The bolts are only conventionally shown in the accompanying drawings.

I provide a central partition frame consisting of spaced uprights 13 and 14. To the sides of these uprights I secure ledges 15 and 16 which are arranged opposite to the ledges 7 and 8 respectively on the end frames to coact therewith in supporting the coop floors and sub-floors or bottoms. The ledges 15 and 16 being mounted on both sides of the uprights 13 and 14 serve as supports for the transverse vertical partition panels 17 which are inserted between the uprights 13 and 14 and between the pairs of ledges. The bottoms of these transverse partition panels are supported by the plates 18 secured to the under sides of the lower pair of ledges 15 to extend across the space between the lower pair of ledges 15, see Fig. VII. The several partition panels, the end wall panels and the coop bottoms are preferably formed of wire frames 19 with woven wire screens 20 secured thereto.

The horizontal arms of the ledges 15 and 16, other than the bottom pair, are notched at 21 to receive the inner edges of the longitudinal partition panels 22, the outer edges of these panels being supported by the uprights 6 which are spaced to receive them, as described.

The partition panels 22 are adapted to be inserted between the uprights 6 from the ends of the frame. The lower ends of these longitudinal partition panels rest on the bottom members 2 of the end frames and on the horizontal arms of the bottom ledges 15. The transverse partition panels 17 are dropped in from the top of the frame and no means are required for retaining the same. The longitudinal partitions 22 are retained by the end panels 23 which are disposed within the angles of the corner uprights 1 of the frame end members and their top pieces 3 and are secured therein by the angled clips 24, the clips being mounted on the corner uprights by bolts 25, see Fig. X.

The top panel 40 rests in the angles of the top, horizontal members 12, see Fig. V. I show no retaining means for the top panel as its weight will ordinarily be found sufficient. The retaining clips 24 may be used if desired.

The side walls are formed of sections consisting of top bars 26 and bottom bars 27 having the vertical wires 28 secured thereto. The top and bottom bars are removably secured to the corner uprights and the partition uprights 13 by means of the bolts 29. The top and bottom bars of adjacent sections are spaced so that the screen compartment floors 30 and the sub-floors or pans 31 may be slid onto the ledges provided therefor from the outside and without disturbing the wall panels. The pans are freely removable so that the coops may be conveniently cleaned as any matter on the screen coop floors drops through to the pans. Each side wall section is provided with sliding doors 32 through which the fowls may be introduced or removed from the compartment.

The feed and water troughs 33 are supported by hangers 34 which are pivoted upon the studs 35 and provided with downwardly projecting arms 36 resting against the bottom bars 27 of the side wall panels when the hangers are extended. The outer ends of the hangers are V-shaped to receive the troughs 33. The troughs are thus supported so as to be readily accessible to the fowls within the compartments. The hangers may be swung inwardly on their pivots when the structure is knocked down. I preferably provide caster wheels 37 which are mounted on the bottom corner irons 4.

With the parts thus arranged my improved coop can be readily set up or knocked down and when knocked down can be conveniently packed for storage or transportation as the end members of the frame, the partition frame member, the top and bottom horizontal frame members, the central frame member, the wall panels, and the bottom and bottom pans may be compactly stacked or packed together. The frame structure may be quickly set up or assembled and the wall panels inserted and secured as described.

The several compartments are arranged so that they are all readily accessible and open to view so that the structure is particularly well adapted for the display of poultry as for exhibition purposes. The structure is also designed as a battery feeder, that is, for feeding large numbers of fowls in producing what is commonly known as milk fed chickens, the feeders being generally designated as battery feeders. The structure is of particular advantage in that a large number of fowls may be cared for in a small space with only a few in a compartment which is necessary to the best results in feeding as is well appreciated by poultrymen.

The coop can be kept in a very sanitary condition as the parts are all metal and can be treated with insecticides as desired.

In the drawing I have indicated parts, such as the bolts for joining the frame parts, the screen, wall panels and floors and certain other parts conventionally, as the structure will be clearly understood.

Having thus described my invention, what I claim as new and desire to secure by Letters Patent, is:

1. In a structure of the class described, the combination of a frame comprising end members each consisting of angle iron corner uprights and top and bottom pieces united by corner irons, the corner uprights and the top pieces being disposed with their angles facing outwardly, a pair of angle iron partition uprights secured in a spaced relation to the inner sides of the top and bottom members, and pairs of floor and sub-floor supporting ledges secured on the inner sides of said corner uprights and said partition uprights, top and bottom longitudinal frame members removably secured to said corner irons, the top longitudinal frame members being disposed with their angles facing upwardly, a partition frame removably secured to said top and bottom longitudinal frame members and comprising uprights and angle iron ledges secured in pairs on opposite sides thereof and disposed oppositely to the said ledges on said frame end members to coact therewith, the horizontal arms of said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels disposed in the angles of said end frame members and secured therein, said end panels constituting retaining means for said longitudinal partition panels, a top panel disposed in the angles of the said top longitudinal members, screen floors slidably arranged on said floor ledges, floor pans slidably arranged on said sub-floor ledges below said screen floors, and side wall panels removably mounted on said corner uprights and spaced so as to permit the removal of said floors and pans.

2. In a structure of the class described, the combination of a frame comprising end members each consisting of angle iron corner uprights and top and bottom pieces united by corner irons, the corner uprights and the top pieces being disposed with their angles facing outwardly, a pair of angle iron partition uprights secured in a spaced relation to the inner sides of the top and bottom members, and pairs of floor and sub-floor supporting ledges secured on the inner sides of said corner uprights and said partition uprights, top and bottom longitudinal frame members removably secured to said corner irons, a partition frame removably secured to said top and bottom longitudinal frame members and comprising uprights and angle iron ledges secured in pairs on opposite sides thereof and disposed oppositely to the said ledges on said frame end members to coact therewith, the horizontal arms of said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels disposed in the angles of said end frame members and secured therein, said end panels constituting retaining means for said longitudinal partition panels, a top panel, screen floors slidably arranged on said floor ledges, floor pans slidably arranged on said sub-floor ledges below said screen floors, and side wall panels removably mounted on said corner uprights and spaced so as to permit the removal of said floors and pans.

3. In a structure of the class described, the combination of a frame comprising angle iron corner uprights, top and bottom end pieces and top and bottom longitudinal frame members, the corner uprights and the top end pieces being disposed with their angles facing outwardly, the top longitudinal frame pieces being disposed with their angles facing upwardly, pairs of angle iron partition uprights secured in a spaced relation on the inner sides of the top and bottom end members, and pairs of floor and sub-floor supporting ledges secured on the inner sides of said corner uprights and said partition uprights, a partition frame secured to said top and bottom longitudinal frame members and comprising uprights and angle iron ledges secured in pairs on opposite sides thereof and disposed oppositely to the said ledges on said frame end members to coact therewith, the horizontal arms of said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels disposed in the angles of said corner uprights and end top members and secured therein, said end panels constituting retaining means for said longitudinal partition panels, a top panel disposed in the angles of the said top longitudinal members, screen floors slidably arranged on said floor ledges, floor pans slidably arranged on said sub-floor ledges below said screen floors, and side wall panels mounted on said corner uprights in a spaced relation to permit the removal of said floors and pans between the side wall panels.

4. In a structure of the class described, the combination of a frame comprising angle iron corner uprights, top and bottom end pieces and top and bottom longitudinal frame members, the corner uprights and the top end pieces being disposed with their angles facing outwardly, pairs of angle iron partition uprights secured in a spaced relation on the inner sides of the top and bottom end members, and pairs of floor and sub-floor supporting ledges secured on the inner sides of said corner uprights and said partition uprights, a partition frame secured to said top and bottom longitudinal frame members and comprising uprights and angle iron ledges secured in pairs on opposite sides thereof and disposed oppositely to the said ledges on said frame end members to coact therewith, the horizontal arms of said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels disposed in the angles of said corner uprights and end top members and secured therein, said end panels constituting retaining means for said longitudinal partition panels, a top panel, screen floors slidably arranged on said floor ledges, floor pans slidably arranged on said sub-floor ledges below said screen floors, and side wall panels mounted on said corner uprights in a spaced relation to permit the removal of said floors and pans between the side wall panels.

5. In a structure of the class described, the combination of a frame comprising angle iron corner uprights, top and bottom end pieces and top and bottom longitudinal frame members, the corner uprights and the top end pieces being disposed with their angles facing outwardly, the top longitudinal frame pieces being disposed with their angles facing upwardly, pairs of angle iron partition uprights secured in a spaced relation on the inner sides of the top and bottom end members, and floor supporting ledges secured on the inner sides of said corner uprights and said partition uprights, a partition frame secured to said top and bottom longitudinal frame members and comprising uprights and angle iron ledges disposed oppositely to the said ledges on said frame end members to coact therewith, transverse partition panels arranged in said partition frame between said ledges thereon, longitudinal partition panels arranged between said end frame member partition uprights, and the partition frame end wall panels disposed in the angles of said corner uprights and end top members and secured therein, said end panels constituting retaining means for said longitudinal partition panels, a top panel disposed in the angles of the said top longitudinal members, floors arranged on said floor ledges, and side walls.

6. In a structure of the class described, the combination of a frame comprising angle iron corner uprights, top and bottom pieces and top and bottom longitudinal frame members, the corner uprights and the top end pieces being disposed with their angles facing outwardly, pairs of angle iron partition uprights secured in a spaced relation on the inner sides of the top and bottom end members, and floor supporting ledges secured on the inner sides of said corner uprights and said partition uprights, a partition frame secured to said top and bottom longitudinal frame members and comprising uprights and angle iron ledges disposed oppositely to the said ledges on said frame end members to coact therewith, transverse partition panels arranged in said partition frame between said ledges thereon, longitudinal partition panels arranged between said end frame member partition uprights, and the partition frame end wall panels disposed in the angles of said corner uprights and end top members and secured therein, said end panels constituting retaining means for said longitudinal partition panels, a top panel, floors arranged on said floor ledges, and side walls.

7. In a structure of the class described, the combination of a frame comprising end members each consisting of corner uprights, and top and bottom pieces united by corner irons, pairs of partition uprights secured in a spaced relation on said top and bottom members, and pairs of floor and sub-floor supporting ledges secured on said corner and partition uprights, top and bottom longitudinal frame members removably secured to said corner irons, a partition frame removably secured to said top and bottom horizontal frame members and comprising uprights and floor and sub-floor ledges secured in pairs on opposite sides thereof and disposed oppositely to the said ledges on said frame end members to coact therewith, said ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels removably secured to said end frame members, a removable top panel, screen floors arranged on said floor ledges, floor pans slidably arranged on said sub-floor ledges below said screen floors, and side wall panels removably mounted on said corner uprights and spaced so as to permit the removal of said pans.

8. In a structure of the class described, the combination of a frame comprising end members each consisting of corner uprights and top and bottom pieces united by corner irons, pairs of partition uprights secured in a spaced relation on said top and bottom members, and floor ledges secured on said corner and partition uprights, top and bottom longitudinal frame members removably secured to said corner irons, a partition frame removably secured to said top and bottom longitudinal frame members and comprising uprights and floor ledges secured on opposite sides thereof and disposed oppositely to the said ledges on said frame end members to coact therewith, transverse partition panels arranged in said partition frame between said ledges thereon, longitudinal partition panels arranged between said end frame member partition uprights and said partition frame, end wall panels removably secured to said end frame members, a removable top panel, floors arranged on said floor ledges, and removable side walls.

9. In a structure of the class described, the combination of a frame comprising corner uprights, top and bottom end pieces and top and bottom longitudinal frame members, pairs of partition uprights secured in a spaced relation on the top and bottom end members, pairs of floor and sub-floor supporting ledges secured on said corner and partition uprights, a partition frame secured to said top and bottom longitudinal frame members and comprising uprights and floor and sub-floor ledges secured in pairs on opposite sides thereof and disposed oppositely to the said ledges on said frame end members to coact therewith, said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, end wall panels, a top panel, screen floors arranged on said floor ledges, floor pans slidably arranged on said sub-floor ledges below said screen floors, and side walls adapted to permit the removal of said pans, said side walls being provided with suitable doors for the several compartments.

10. In a structure of the class described, the combination of a frame comprising corner uprights, top and bottom end pieces and top and bottom longitudinal frame members, pairs of partition uprights secured in a spaced relation on the top and bottom end members, floor supporting ledges secured on said corner and partition uprights, a partition frame secured to said top and bottom longitudinal frame members and comprising uprights and floor ledges secured on opposite sides thereof and disposed oppositely to the said ledges on said frame end members to coact therewith, said partition frame ledges above the lower pair being centrally notched to receive the inner edges of the longitudinal partition panels, transverse partition panels arranged in said partition frame between said ledges thereon, longitudinal partition panels arranged with their inner edges engaging said notches in said partition frame ledges and their outer edges between said end frame member partition uprights, top and end wall panels, floors slidably arranged on said floor ledges, and side walls adapted to permit the removal of said floors.

11. In a structure of the class described, the combination of a frame comprising corner uprights, top and bottom end pieces and top and bottom longitudinal frame members, pairs of partition uprights secured in a spaced relation on the top and bottom end members, floor supporting ledges secured on said corner and partition uprights, a partition frame secured to said top and bottom longitudinal frame members and comprising uprights and floor ledges secured on opposite sides thereof and disposed oppositely to the said ledges on said frame end members to coact therewith, transverse partition panels arranged in said partition frame between said ledges thereon, longitudinal partition panels arranged between said end frame member partition uprights and the partition frame, top and end wall panels, floors arranged on said floor ledges, and side walls.

12. In a structure of the class described, the combination of a frame comprising corner uprights, top and bottom end pieces and top and bottom longitudinal frame members, pairs of partition uprights secured in a spaced relation on the top and bottom end members, floor supporting ledges secured on said corner and partition uprights, a partition frame secured to said top and bottom longitudinal frame members and comprising uprights and floor ledges secured on opposite sides thereof and disposed oppositely to the said ledges on said frame end members to coact therewith, transverse partition panels arranged in said partition frame between said ledges thereon, supporting plates for said panels secured on the under side of the bottom pair of partition frame ledges, longitudinal partition panels arranged between said end frame member partition uprights and the partition frame, top and end wall panels, floors arranged on said floor ledges, and side walls.

13. In a structure of the class described, the combination of a frame comprising end members each consisting of corner uprights and top and bottom pieces united by corner irons, pairs of partition uprights secured in a spaced relation on the top and bottom members, and pairs of floor and sub-floor supporting ledges secured on said corner and partition uprights, top and bottom longitudinal frame members removably secured to said corner irons, longitudinal partitions arranged between said partition uprights, end wall panels removably secured to said end frame members, a removable top panel, screen floors arranged on said floor ledges, floor pans slidably arranged on said sub-floor ledges below said screen floors, and side wall panels removably mounted on said corner uprights and spaced so as to permit the removal of said pans.

14. In a structure of the class described, the combination of a frame comprising end members each consisting of corner uprights and top and bottom pieces united by corner irons, pairs of partition uprights secured in a spaced relation on the top and bottom members, and floor supporting ledges secured on said corner and partition uprights, top and bottom longitudinal frame members removably secured to said corner irons, longitudinal partitions arranged between said partition uprights, end wall panels removably secured to said end frame members, a removable top panel, floors arranged on said floor ledges, and side walls removably mounted on said corner uprights.

15. In a structure of the class described, the combination of a frame comprising uprights, top and bottom end pieces and top and bottom longitudinal members, pairs of partition uprights secured in a spaced relation on said top and bottom end members, floor and floor pan ledges secured to said corner and partition uprights, longitudinal partitions arranged between said partition uprights, a removable top panel, screen floors slidably arranged on said floor ledges, floor pans slidably arranged on said sub-floor ledges below said screen floors, and wall panels arranged so as to permit the removal of said floors and pans.

16. In a structure of the class described, the combination of a frame comprising uprights, top and bottom end pieces and top and bottom longitudinal members, pairs of partition uprights secured in a spaced relation on said top and bottom end members, floor ledges secured to said corner and partition uprights, longitudinal partitions arranged between said partition uprights, floors arranged on said floor ledges, and top and wall panels.

In witness whereof, I have hereunto set my hand and seal in the presence of two witnesses.

GEORGE E. DEAN. [L. S.]

Witnesses:
S. CRITTENDEN,
ELEANOR FOSKIT.